(12) United States Patent
Hayashi et al.

(10) Patent No.: US 7,821,705 B2
(45) Date of Patent: Oct. 26, 2010

(54) ZOOM MICROSCOPE INCLUDING AN IMAGE-ACQUISITION OPTICAL PATH AND AN OBSERVATION OPTICAL PATH

(75) Inventors: Kazuhiro Hayashi, Akishima (JP); Keiji Shimizu, Fussa (JP)

(73) Assignee: Olympus Corporation, Tokyo (JP)

( * ) Notice: Subject to any disclaimer, the term of this patent is extended or adjusted under 35 U.S.C. 154(b) by 125 days.

(21) Appl. No.: 11/407,138

(22) Filed: Apr. 20, 2006

(65) Prior Publication Data

US 2006/0245048 A1 Nov. 2, 2006

(30) Foreign Application Priority Data

Apr. 25, 2005 (JP) ............................. 2005-126593

(51) Int. Cl.
*G02B 21/00* (2006.01)
(52) U.S. Cl. .................... 359/380; 359/432; 359/434
(58) Field of Classification Search .................. None
See application file for complete search history.

(56) References Cited

U.S. PATENT DOCUMENTS

| 4,175,826 | A | * | 11/1979 | Blaha et al. ................. 359/377 |
| 6,020,993 | A | * | 2/2000 | Greenberg ................... 359/363 |
| 6,097,538 | A | * | 8/2000 | Watanabe et al. ........... 359/390 |
| 6,327,079 | B1 | * | 12/2001 | Namii et al. ................. 359/376 |
| 6,816,321 | B2 | * | 11/2004 | Zimmer et al. .............. 359/686 |
| 2006/0181767 | A1 | * | 8/2006 | Hanzawa ..................... 359/380 |

OTHER PUBLICATIONS

Pedrotti, F. et al., Introduction to Optics, 1993, Prentice-Hall, Second Edition, pp. 136-137.*
Akihiro Youka et al., "Chapter 3.5:Resolution and Overall Magnification," Principles of Biological Microscopes, Baifukan, pp. 34-39, (Jun. 20, 1973).

* cited by examiner

*Primary Examiner*—Stephone B Allen
*Assistant Examiner*—Derek S Chapel
(74) *Attorney, Agent, or Firm*—Pillsbury Winthrop Shaw Pittman, LLP (57) ABSTRACT

The exposure time for obtaining a bright image in an image-acquisition optical system can be reduced, and shifting of an image visually observed in an observation optical system is prevented, thus enabling stable observation. A microscope including an image-acquisition optical path for recording an image focused by an objective lens and an observation optical path for visually observing an image split-off from the image-acquisition optical path; and including an aperture stop, in the observation optical path, for stopping down the numerical aperture thereof to smaller than the numerical aperture of the image-acquisition optical path.

11 Claims, 5 Drawing Sheets

ZOOM MICROSCOPE INCLUDING AN IMAGE-ACQUISITION OPTICAL PATH AND AN OBSERVATION OPTICAL PATH

BACKGROUND OF THE INVENTION

1. Field of the Invention

The present invention relates to optical microscopes, and more particularly, to a microscope including an observation optical path for visual observation of an image and an image-acquisition optical path for recording an image.

This application is based on Japanese Patent Application No. 2005-126593, the content of which is incorporated herein by reference.

2. Description of Related Art

Conventionally, because the main application of microscopes has been observation with the eye, their optical specifications have been set within ranges suitable for visual observation (for example, see Principles of Biological Microscopes by Akihiro YOUKA, published by Baifukan, 20 Jun. 1973, Chapter 3, Objective Lenses).

According to Principles of Biological Microscopes by Akihiro YOUKA, published by Baifukan, 20 Jun. 1973, Chapter 3, Objective Lenses, the following expression gives the range of overall effective magnification for a microscope:

$$400NA < M < 1000NA$$

Here, NA is the numerical aperture, and M is the overall magnification.

The range given above indicates the range over which a suitable resolution can be obtained for visual observation; although there are also values outside of this range for various applications, products generally fall within this approximate range.

Recently, however, microscopes are not just being used for visual observation; their use as image-acquisition optical systems is becoming more and more common. In optical systems for image acquisition, the conventional concepts of effective magnification and empty magnification are not necessarily applicable.

In an image-acquisition optical system, for a constant overall effective magnification, the brightness of the image is proportional to the square of the numerical aperture. Therefore, a correspondingly bright image is obtained, and the exposure time is short. This is a particularly strong merit for taking images of specimens which move around, such as small living organisms, for which exposure must be completed within a short period of time.

On the other hand, if the range of overall effective magnifications is exceeded and a low magnification is set, not only is the resolution of the eye lower than the resolution of the optical system, thus not making full use of the resolving power of the microscope, but if the eye shifts when observing a comparatively deep specimen with the microscope, there is also a problem in that the image wobbles and becomes difficult to see.

Although there are differences in the way observers perceive things, this nevertheless causes unstable vision and may even result in nausea when observing for a long period of time. Therefore, the optical system for visually observing the image should preferably have specifications falling within the range of overall effective magnifications shown in non-patent document 1.

BRIEF SUMMARY OF THE INVENTION

The present invention has been conceived in light of the circumstances described above, and an object thereof is to provide a microscope in which the exposure time for obtaining a bright image in an image-acquisition optical system can be reduced and in which image shifting can be prevented in an observation optical system, thus enabling stable observation.

In order to realize the object described above, the present invention provides the following solutions.

A microscope according to a first aspect of the present invention comprises:

an objective lens;

an afocal variable-magnification optical system, disposed at an exit side of the objective lens, for variably magnifying the size of an image of the objective lens; and an image-forming optical system, disposed at an exit side of the afocal variable-magnification optical system, for imaging the image of the objective lens, wherein the following conditional expression is satisfied:

$$D > \phi 18$$

where symbol D represents an exit beam diameter of the afocal variable-magnification optical system.

In the microscope according to this aspect:

the variable magnification ratio of the afocal variable-magnification optical system may be from 1:1 to 1:10.

The microscope according to this aspect may further comprise:

a splitting member, disposed at the exit side of the image-forming lens, for splitting into an observation optical path and an image-acquisition optical path;

an observation optical system, disposed in the observation optical path, for visually observing an image split-off from the image-acquisition optical path; and an aperture stop, disposed in the observation optical path, for stopping down a numerical aperture thereof to smaller than a numerical aperture of the image-acquisition optical path.

In the microscope according to this aspect:

the observation optical path may comprise:

a relay optical system for relaying a pupil of the objective lens, the aperture stop being disposed in the vicinity of a conjugate position of the objective lens pupil relayed by the relay optical system.

The microscope according to this aspect may further comprise:

an optical-path-splitting member, disposed before the pupil conjugate position in the observation optical path, for splitting the optical path into two, wherein in the vicinity of each pupil conjugate position in the two optical paths split by the optical-path-splitting member, respective aperture stops are disposed so as to be mutually decentered relative to the observation optical path.

In the microscope according to this aspect, the aperture stop, the objective lens, and the optical-path-splitting member are disposed as described above, and the relay optical system may comprise:

a plurality of reflecting members disposed in such a manner that the angles thereof can be varied.

The microscope according to this aspect may further comprise:

a relay optical system having a plurality of reflecting members disposed in such a manner that the angles thereof can be varied; and a recording apparatus for recording the image formed by the image-forming optical system.

In the microscope according to this aspect:

the splitting member, the observation optical system, and the aperture stop are disposed as described above, and the following conditional expression may be satisfied

M<200NA where symbol M represents an overall magnification of an optical system at the observation optical path side of the objective lens, and symbol NA represents an entrance numerical aperture of the objective lens.

A microscope according to a second aspect of the present invention comprises:

an objective lens;

an afocal variable-magnification optical system, disposed at an exit side of the objective lens, for variably magnifying the size of an image of the objective lens;

an image-forming optical system, disposed at an exit side of the afocal variable-magnification optical system, for imaging the image of the objective lens;

a splitting member, disposed at an exit side of the image-forming lens, for splitting into an observation optical path and an image-acquisition optical path; and an observation optical system, disposed in the observation optical path, for visually observing an image split-off from the image-acquisition optical path, wherein the following conditional expression is satisfied

M<200NA where symbol M represents an overall magnification of an optical system at the observation optical path side of the objective lens, and symbol NA represents an entrance numerical aperture of the objective lens.

The microscope according to this aspect may further comprise:

an image-acquisition aperture stop, disposed in the image-acquisition optical path, for stopping down a numerical aperture thereof; and an observation aperture stop, disposed in the observation optical path, for stopping down a numerical aperture thereof, wherein the observation stop is stopped down smaller than the image-acquisition stop.

In the microscope according to this aspect:

the image-acquisition aperture stop and the observation aperture stop are disposed as described above, and the observation optical path may comprise:

a relay optical system for relaying a pupil of the objective lens, the observation aperture stop being disposed in the vicinity of a conjugate position of the objective lens pupil relayed by the relay optical system.

The microscope according to this aspect may further comprise:

an optical-path-splitting member, disposed before the pupil conjugate position in the observation optical path, for splitting the optical path into two, wherein in the vicinity of each pupil conjugate position in the two optical paths split by the optical-path-splitting member, respective observation aperture stops are disposed so as to be mutually decentered relative to the observation optical path.

In the microscope according to this aspect:

the observation aperture stop, the objective lens, and the optical-path-splitting member are disposed as described above, and the relay optical system may comprise:

a plurality of reflecting members disposed in such a manner that the angles thereof can be varied.

In the microscope according to this aspect, the image-acquisition aperture stop and the observation aperture stop are disposed as described above, and the microscope may further comprise:

a recording apparatus for recording an image focused by the image-acquisition optical system.

DETAILED DESCRIPTION OF THE INVENTION

A microscope 1 according to an embodiment of the present invention will be described below with reference to FIGS. 1 to 8.

Figure 1:
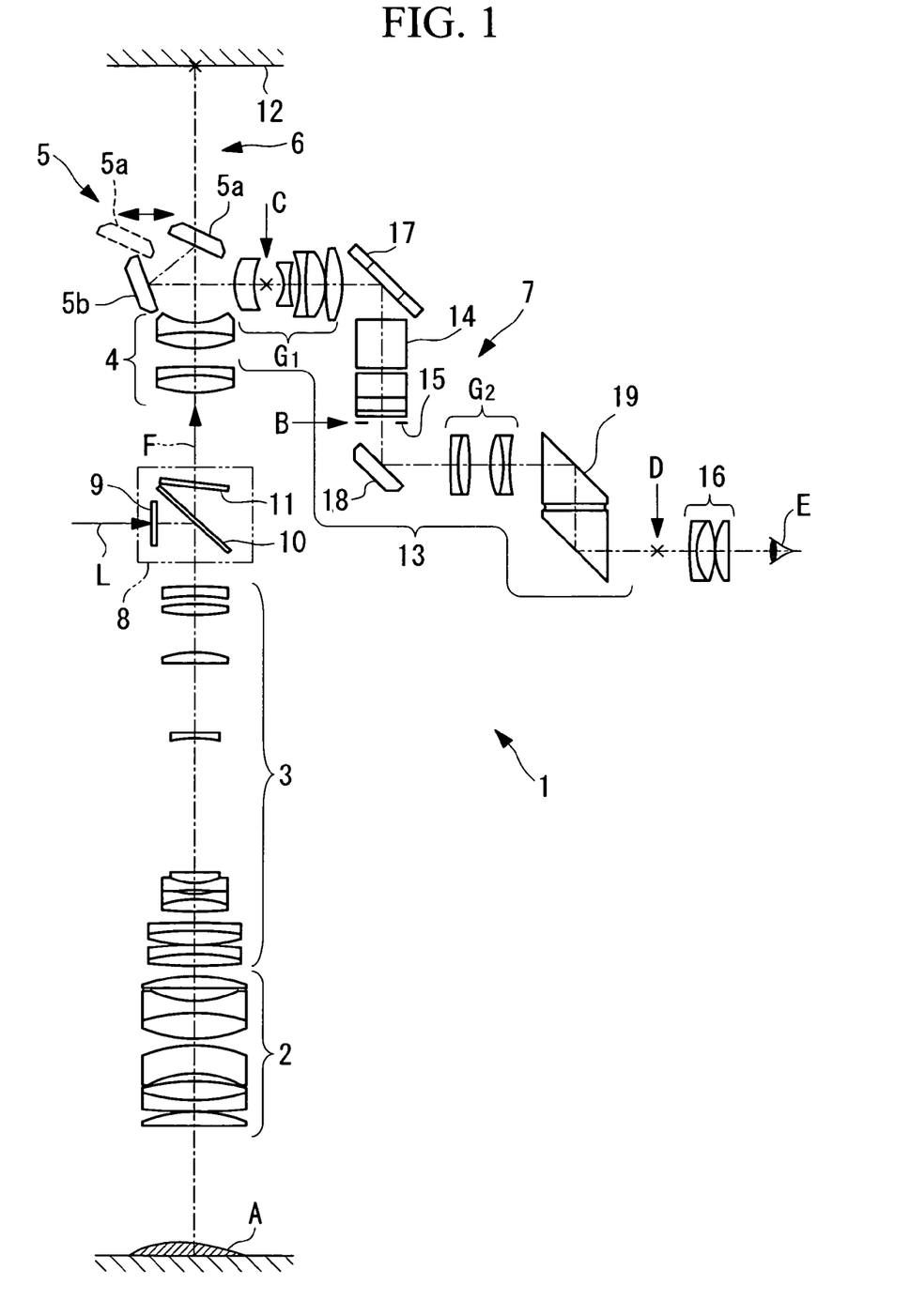
FIG. 1 is an overall configuration diagram showing a microscope according to an embodiment of the present invention in terms of its lens arrangement.

As shown in FIG. 1, the microscope 1 according to this embodiment includes, in order from a specimen A side, an objective optical system 2 for collecting light from the specimen A; a variable-magnification optical system 3 which can vary the magnification of an image; an image-forming lens 4 for forming an image of the light that has passed through the variable-magnification optical system 3; a first optical-path-splitting member 5, disposed after the image-forming lens 4, for splitting the optical path; and an image-acquisition optical path 6 and an observation optical path 7, which are split-off by the first optical-path-splitting member 5. A filter set 8 for introducing illumination light L is disposed between the variable-magnification optical system 3 and the image-forming lens 4. An optical system for the illumination which is incident on the filter set 8 is omitted in FIG. 1.

The objective optical system 2 includes a plurality of lenses which are arranged in the optical-axis direction; for example, an optical system having a focal length of 90 mm and a maximum lens diameter of about 50 mm is used. The working distance is 65 mm, which ensures a sufficient distance for manipulating the specimen while observing it.

The variable-magnification optical system 3 can vary the magnification, for example, from 0.31 to 3.1 by moving in the optical-axis direction some of the plurality of lenses which are arranged in the optical-axis direction. In other words, the variable-magnification ratio of the variable-magnification optical system can be varied from 1:1 to 1:10. The variable-magnification optical system is an afocal optical system whose magnification is given by the incident beam diameter/the exit beam diameter.

The image-forming lens 4 has a focal length of 180 mm, for example. This embodiment is configured such that the magnitude of the exit beam diameter D of the variable-magnification optical system 3 of the optical system formed of the objective optical system 2, the variable-magnification optical system 3, and the image-forming lens 4 is given by D=28 mm, when the magnification of the variable-magnification optical system 3 is 0.31. Therefore, each lens in the optical system has an outer diameter satisfying D=28 mm. With such a configuration, in the image-acquisition optical system, it is possible to acquire an image with sufficient brightness and high resolution. When there is a size restriction or the like for the outer diameter of the optical system, the above-described advantage can be achieved up to D=18 mm.

The filter set 8 includes, for example, an excitation filter 9, a dichroic mirror 10, and a barrier filter 11. By introducing illumination light L, which is incident from a light source, to the excitation filter 9, the excitation light passes through and is reflected towards the specimen A by the dichroic mirror 10, whereas fluorescence F returning from the specimen A is transmitted through the dichroic mirror 10 and travels towards the image-forming lens 4. By means of the barrier filter 11 which is disposed after the dichroicmirror 10, it is possible to prevent part of the excitation light transmitted through the dichroic mirror 10 from being incident on components from the image-forming lens 4 onwards.

In the example shown in FIG. 1, the first optical-path-splitting member 5 includes, for example, two mirrors 5a and 5b which reflect the light emerging from the image-forming lens 4. One of the mirrors, mirror 5a, can be inserted in and removed from the optical path from the image-forming lens 4. By doing so, when the mirror 5a is inserted in the optical path, it is possible to reflect the fluorescence F from the image-forming lens 4 and to orient it along the observation optical path. When the mirror 5a is removed from the optical path, it is possible to orient the fluorescence F from the image-forming lens 4 undeflected along the image-acquisition optical path 6.

In the image-acquisition optical path 6, an image-acquisition plane 12 of an image-acquisition apparatus, for example, a CCD camera or the like, is disposed at the focal position of the image-forming lens 4. By removing the mirror 5a from the optical path by operating the first optical-path-splitting member 5, it is possible to guide the fluorescence F passing through the image-forming lens 4 directly to the image-acquisition plane 12.

The observation optical path 7 includes a relay optical system 13 which relays and re-images the image formed after being focused by the image-forming lens 4 and reflected by the first optical-path-splitting member 5; a second optical-path-splitting member 14, disposed at an intermediate position of the relay optical system 13, for splitting the observation optical path 7 into two; an aperture stop 15 disposed at a conjugate position B of the pupil of the objective lens 2, which is relayed by the relay optical system 13; and an eyepiece lens 16.

The relay optical system 13 includes two lens groups G1 and G2 which are disposed on either side of the pupil conjugate position B, which is formed at the middle of two image positions C and D.

Figure 2:
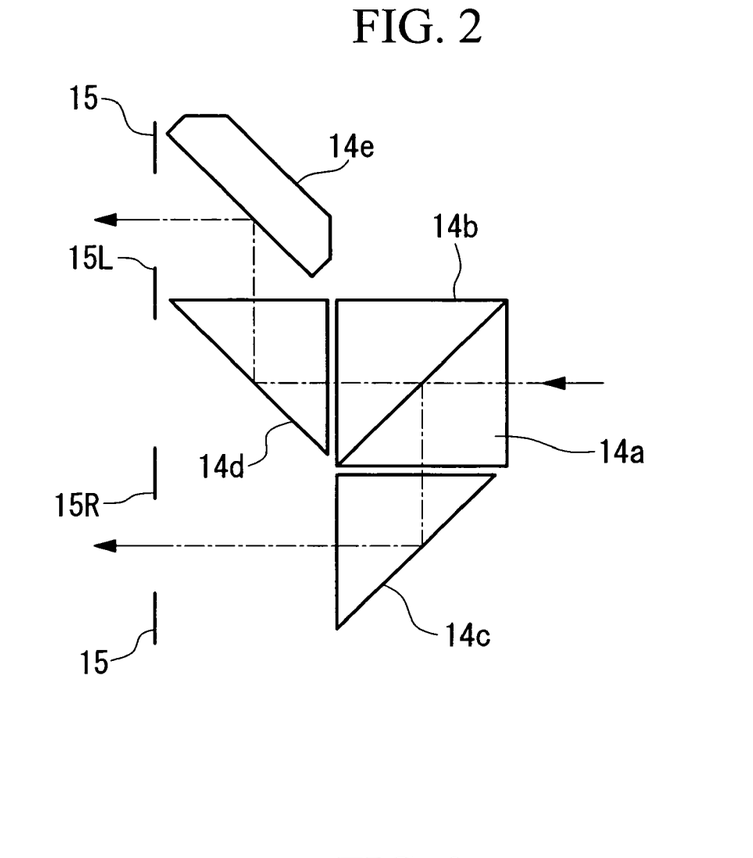
FIG. 2 is a diagram showing an example of an optical-path-splitting member disposed in an observation optical path in the microscope in FIG. 1.

As shown in FIG. 2, the second optical-path-splitting member 14 is formed, for example, of a plurality of prisms 14a to 14d and a mirror 14e. The second optical-path-splitting member 14 is disposed between the pupil conjugate position B relayed by the relay optical system 13 and the lens group G1. Therefore, two of the observation optical systems 7, that is, the aperture stop 15, the second lens group G2, and the eyepiece lens 16, are disposed after the second optical-path-splitting member 14, for both eyes, one for the left and one for the right. The magnification of the relay optical system 13 is, for example, 1, and the magnification of the eyepiece lens 16 is, for example, 10. In FIG. 1, reference numerals 17, 18, and 19 are mirrors and prisms constituting the observation optical path 7.

Figure 3:
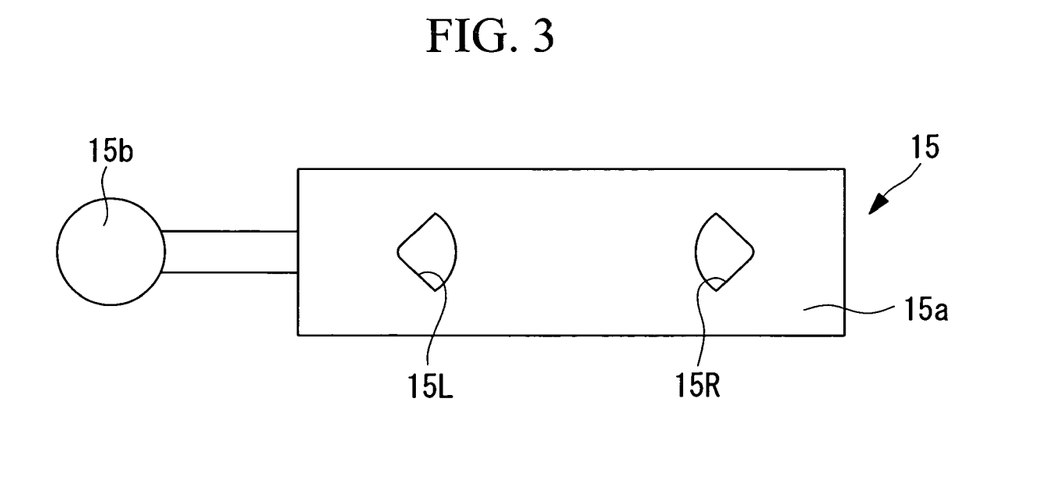
FIG. 3 is a diagram showing an example of an aperture stop disposed in the observation optical path in the microscope in FIG. 1.
Figure 4A:
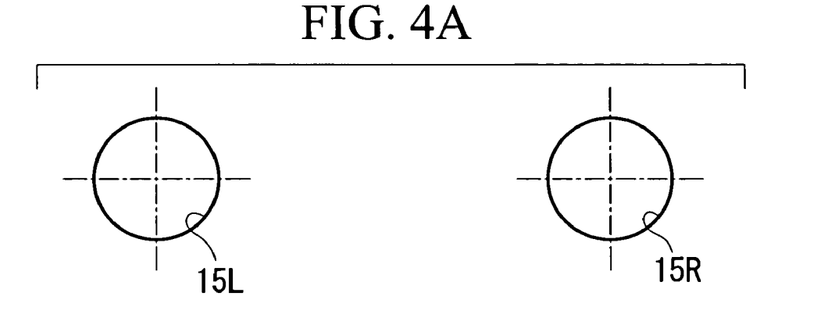
FIGS. 4A to 4D are diagrams showing the shape of apertures in the aperture stop in FIG. 3.
Figure 4B:
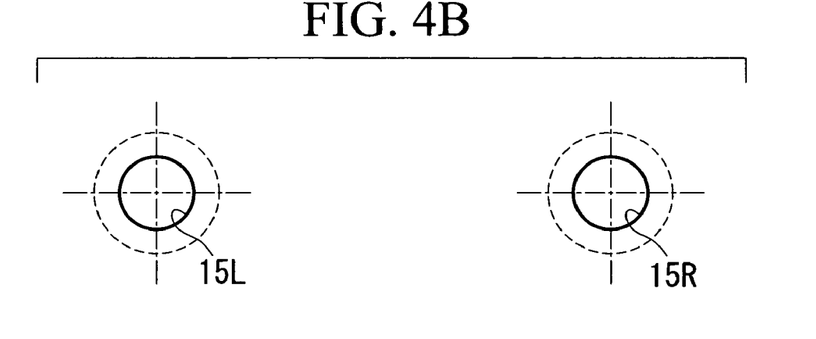
Figure 4C:
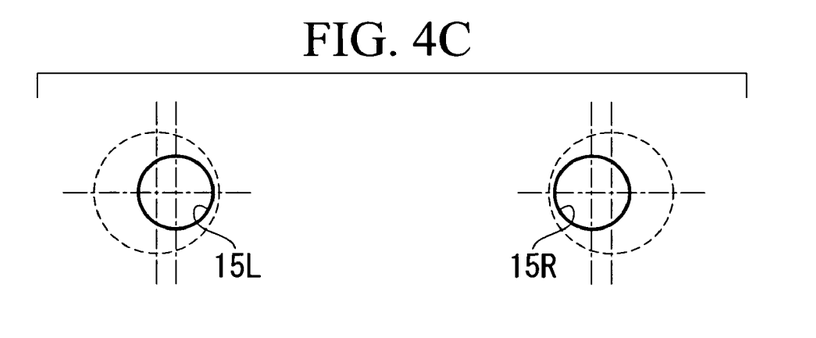
Figure 4D:
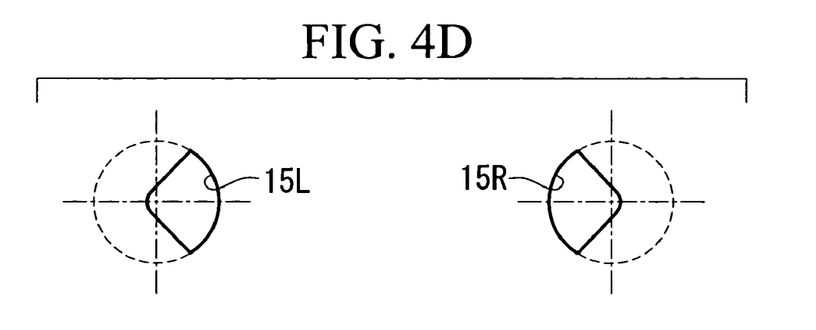

As shown in FIG. 3, the aperture stop 15 described above is formed, for example, of a plate 15a having a pair of apertures 15L and 15R for the left and right eyes. Reference numeral 15b is a gripping portion for manipulating the plate 15a to put it in or take it out.

Apertures with various shapes are used as the apertures 15L and 15R. For example, it is possible to use the apertures in FIG. 4A, which are open and do not stop the beams; the apertures in FIG. 4B, which stop down to a predetermined numerical aperture; the apertures in FIG. 4C, which stop down and are decentered; or the apertures in FIG. 4D, which are decentered and have modified aperture shapes. The broken lines in these drawings show the beam diameters before the aperture stop. Therefore, by replacing the plate 15a, it is possible to change the way in which the beam is stopped down.

The operation of the microscope 1 according to this embodiment, having such a configuration, will be described below.

To acquire an image of the specimen A using the microscope 1 according to this embodiment, the mirror 5a constituting the first optical-path-splitting member 5 is removed from the optical path and illumination light L is introduced from the illumination optical path. When the illumination light is incident on the filter set 8, it forms excitation light by means of the excitation filter 9, and thereafter, it is reflected by the dichroic mirror 10 and irradiates the specimen A via the variable-magnification optical system 3 and the objective optical system 2. Fluorescence F which is generated by excitation of a fluorescent substance in the specimen A is collected by the objective optical system 2, is incident on the image-forming lens 4 via the variable-magnification optical system 3, the dichroic mirror 10, and the barrier filter 11, enters the image-acquisition optical path 6 directly, and forms an image at the image-acquisition plane 12 without its numerical aperture being stopped down.

Therefore, by constructing the system in this way, it is possible to acquire an image with sufficient brightness and high resolution in the image-acquisition optical system. If the entrance numerical aperture of the objective lens 2 is kept high, for example, if the relationship M<200NA is satisfied, where M is the overall observation magnification of the microscope 1 and NA is the entrance numerical aperture of the objective lens 2, it is possible to make the fluorescence incident on the image-acquisition plane 12 while maintaining a high numerical aperture, and it is therefore possible to acquire a bright fluorescence image. As a result, it is possible to obtain images with a short exposure time, and it is possible to obtain blur-free images of the specimen, even for a live specimen such as small live animals, for example, nematodes or fish embryos and so forth. This is particularly advantageous for fluorescence observation in the extremely low magnification region where it is difficult to obtain sufficient brightness.

Next, to visually observe the specimen using the microscope 1 according to this embodiment, the mirror 5a constituting the first optical-path-splitting member 5 is inserted into the optical path, and the illumination light L is introduced from the illumination optical path.

The fluorescence F produced in the specimen A and following the same path as described above to be focused by the image-forming lens 4 is reflected by the mirrors 5a and 5b in the first optical-path-splitting member 5 and enters the observation optical path 7.

The fluorescence F entering the observation optical path 7 passes through the first lens group G1 in the relay optical system 13 and is split into two (left and right) optical paths by the second optical-path-splitting member 14; thereafter, it is stopped down by the aperture stop 15, passes through the second lens group G2, and is incident on the eyepiece lens 16. During this passage, the fluorescence F forms images at the two image positions C and D by means of the relay optical system 13. Accordingly, an erect image is obtained in the visual observation via the eyepiece lens 16, and it is thus possible to easily manipulate the specimen A while observing it with the microscope 1.

In this case, according to this embodiment, by using the aperture stop 15 disposed in the observation optical path 7, it is possible to stop-down to a numerical aperture sufficiently smaller than the numerical aperture of the image-acquisition optical path 6.

When the numerical aperture of the observation optical path 7 is equal to the comparatively large numerical aperture of the image-acquisition optical path 6, the problems described below occur.

Figure 5A:
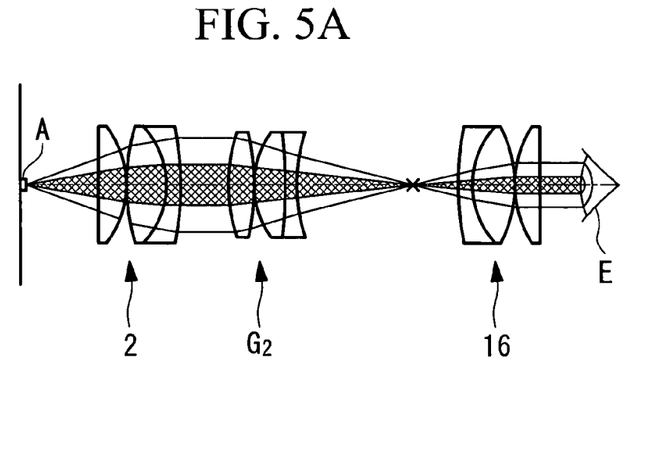
FIGS. 5A and 5B are diagrams for explaining a case where no aperture stop is provided in the observation optical path in the microscope in FIG. 1.
Figure 5B:
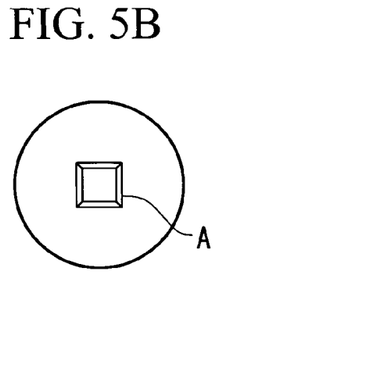
Figure 6A:
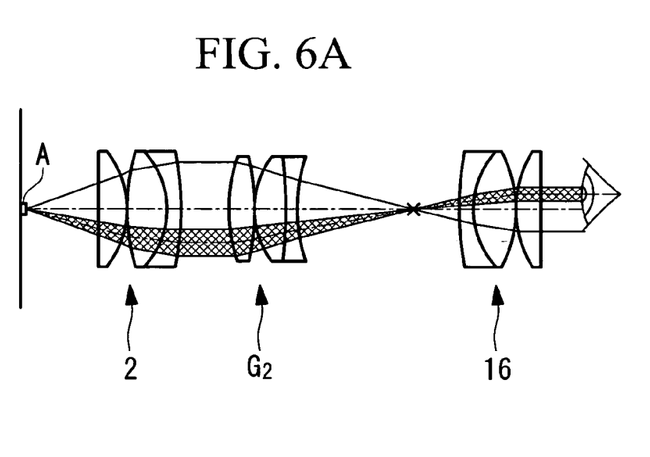
FIGS. 6A and 6B are diagrams for explaining a case where the position of an eye in FIG. 5 has shifted.
Figure 6B:
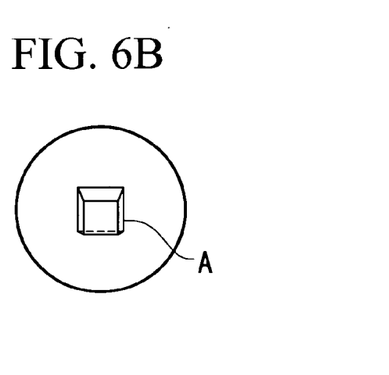

Specifically, as shown in FIGS. 5 and 6, if the pupil of an eye E is relatively small compared to the exit pupil of the optical system, the pupil of the eye E effectively becomes an aperture stop (in FIG. 5A, only the hatched part of the beam enters the pupil of the eye E). Therefore, shifting of the position of the eye E relative to the observation optical path 7 will cause the microscope 1 to become a decentered optical system, and the angle of the chief ray will vary.

FIG. 5 shows a case where the pupil position of the eye E is located on the optical axis, and FIG. 6 shows a case where the pupil position of the eye E is shifted in a direction intersecting the optical axis. FIGS. 5B and 6B each show an image of the specimen A visually observed. As is clear from FIGS. 5 and 6, when the eye E shifts, the specimen A is observed from various orientations, which causes a phenomenon whereby the image appears to wobble and be unstable. In addition, when observing a specimen A having depth, as shown in FIG. 6B, there is also a problem in that the shape of the specimen A appears to change depending on the pupil position of the eye E.

In contrast, with the microscope 1 according to this embodiment, using the aperture stop 15 which is inserted in the observation optical path 7, it is possible to stop down the numerical aperture to a size at which a necessary and sufficient magnification is obtained. The size of the numerical aperture at which the necessary and sufficient magnification is obtained depends upon differences among individuals and variations in the size of the pupil of the eye E with brightness, but it is preferably in the range satisfying 200NA<M<1000NA, and more preferably in the range satisfying 400NA<M.

Figure 7A:
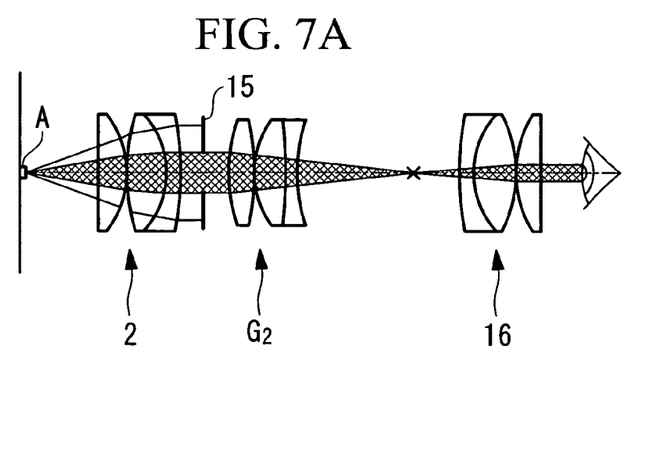
FIGS. 7A and 7B are diagrams for explaining a case where the aperture stop is provided in the observation optical path of the microscope in FIG. 1.
Figure 7B:
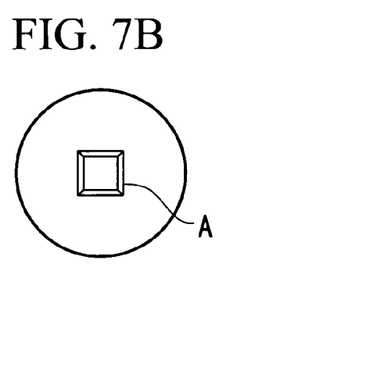

As shown in FIG. 7, by setting up the system in this way, it is possible to prevent the pupil of the eye E from acting as the aperture stop 15, and it is thus possible to reduce the amount of image shifting, thus facilitating observation.

With the microscope 1 according to this embodiment, because the aperture stop 15, which is inserted into the observation optical path 7, is disposed substantially at the pupil conjugate position B of the objective lens 2, which is relayed by the relay optical system 13, it is possible to minimize field shading and the like which occurs when the aperture stop 15 is stopped down.

Figure 8A:
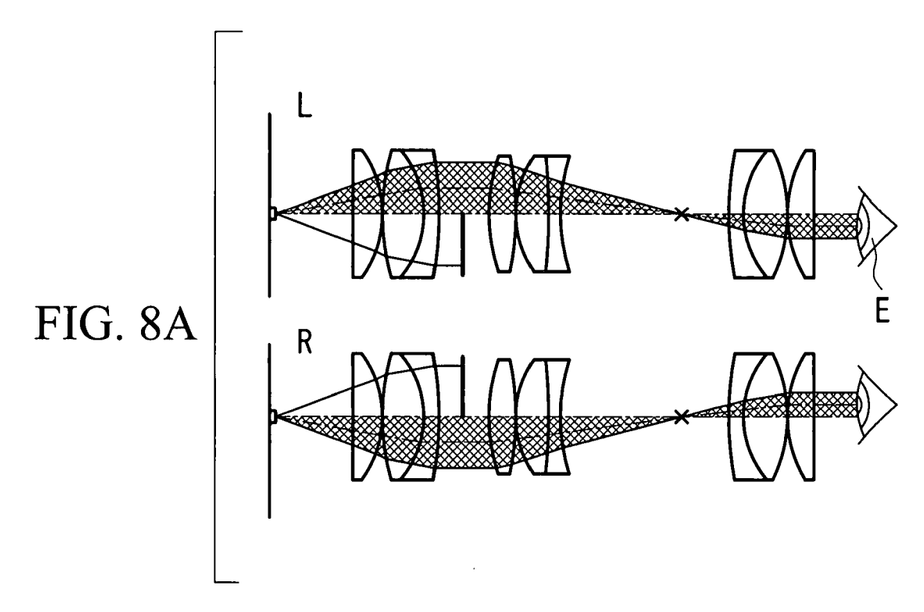
FIGS. 8A and 8B are diagrams for explaining a case where the aperture stop in the microscope in FIG. 1 is decentered.
Figure 8B:
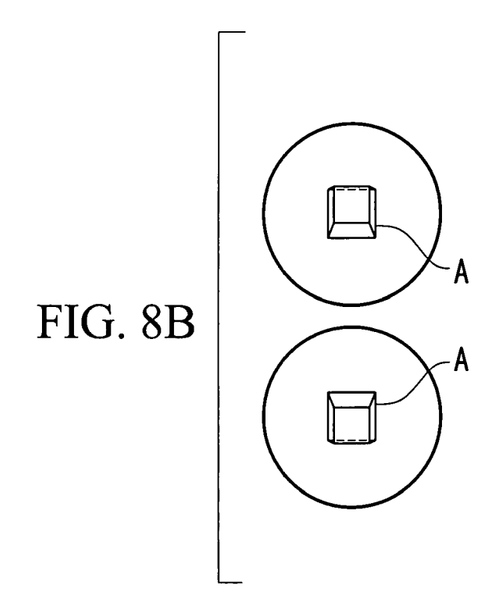

Furthermore, with the microscope 1 according to this embodiment, because a pupil conjugate position is formed for each of the left and right eyes E by the second optical-path-splitting member 14 and the aperture stop 15 is disposed in the vicinity of each pupil conjugate position B, as shown in FIG. 8, it is possible to provide appropriate parallax between the beams which are guided to the left and right eyes E by inserting the aperture stop 15 having the form of decentered apertures 15L and 15R. By doing so, when observing a specimen A having depth, the specimen A can be observed stereoscopically, and it is therefore possible to more easily manipulate the specimen A while observing it with the microscope 1.

As described above, with the microscope 1 according to this embodiment, the numerical apertures of the image-acquisition optical path 6 and the observation optical path 7 can be properly set, and it is possible to provide the microscope 1 which is suitable for a broad range of applications which do not exist in the related art.

This embodiment is illustrated by an example in which the variable-magnification optical system 3 is provided; instead of this, however, the variable-magnification optical system 3 may be omitted. Furthermore, although the first optical-path-splitting means 5 is disposed after the image-forming lens 4, instead of this, it may be disposed before the image-forming lens 4, or the image-forming lens 4 may be disposed in each optical path after the splitting them.

The first optical-path-splitting means 5 having a design in which the mirror 5a is inserted and removed has been illustrated as an example; instead of this, however, it may be constituted by a half-mirror. Also, the angle of the eyepiece lenses 16 may be varied by changing the angle of the mirrors 5a, 5b, 17, and 18. For example, this embodiment has a configuration in which the tilt angle can be varied from 0 to 45 degrees.

Furthermore, although the microscope 1 illustrated in this embodiment is for fluorescence observation, it is not limited to this; it can also be applied to a microscope 1 of the type which introduces visible light and observes its reflected or transmitted light. In such a case, the filter set 8 should be replaced with a half-mirror.

In the microscope 1 according to this embodiment, the second optical-path-splitting member 14 is disposed directly before the pupil conjugate position B which is relayed by the relay optical system 13, but it is not limited to this; in order to enable stereoscopic observation, any position before the pupil conjugate position B is acceptable, or if stereoscopic observation is not to be carried out, it may be disposed at any position up to the eyepiece lenses 16. It may also be applied to a microscope 1 which is not provided with the second optical-path-splitting member 14 and which has a single eyepiece lens 16.

The aperture stop 15 has been illustrated using the example of an object which can be changed by putting in and taking out the plate 15 having the pair of apertures 15L and 15R for the left and right eyes E; instead of this, however, it is also possible to employ an object designed to vary the aperture diameters or an object which has a plurality of pairs of apertures 15L and 15R in the same plate 15a and which is designed to switch between them by changing the position thereof.

With the microscope 1 of this embodiment, it is possible to open up the aperture stop 15 disposed in the observation optical path 7 so as not to restrict the beam. Doing so allows easy observation, particularly of a dark image. When the observed image is dark, the pupil of the eye E opens more than when the observed image is bright, so even if the eye E shifts, the phenomenon whereby the image appears to wobble does not easily occur. In addition, because a beam larger than the eye E is obtained, it is easy to observe an image as a difference in S/N, even if the numerical aperture is so large that the image cannot be resolved. This is particularly advantageous in cases where it is difficult to obtain sufficient brightness over a wide observation range, such as fluorescence observation in the extremely low-magnification region, such as an overall effective magnification of less than 20.

Additional Items

1. A microscope comprising:
    an image-acquisition optical path for recording an image focused by an objective lens; and
    an observation optical path for visually observing an image split-off from the image-acquisition optical path; and
    comprising an aperture stop, in the observation optical path, for stopping down the numerical aperture thereof to less than the numerical aperture of the image-acquisition optical path.

2. A microscope according to additional item 1 which satisfies the following conditional expression:

$$M < 200NA$$

where the symbol M is the overall effective magnification of the microscope, and the symbol NA is the entrance numerical aperture of the objective lens.

3. A microscope according to additional item 1 or additional item 2, further comprising:
    a relay optical system, in the observation optical path, for relaying a pupil of the objective lens,
    wherein the aperture stop is disposed in the vicinity of a conjugate position of the objective lens pupil relayed by the relay optical system.

4. A microscope according to additional item 3, further comprising:
    an optical-path-splitting member, before the pupil conjugate position in the observation optical path, for splitting the optical path into two,
    wherein, in the vicinity of each pupil conjugate position in the two optical paths split by the optical-path-splitting member, respective aperture stops are disposed so as to be mutually decentered relative to the observation optical path.

Advantages of Additional Items

The invention according to Additional Item 1 described above is a microscope comprising an image-acquisition optical path for recording an image focused by the objective lens and an observation optical path for visually observing an image split-off from the image-acquisition optical path; and comprising an aperture stop, in the observation optical path, for stopping down the numerical aperture thereof to smaller than the numerical aperture of the image-acquisition optical path.

With this configuration, the image focused by the objective lens travels, on the one hand, along the image-acquisition optical path and is recorded and travels, on the other hand, along the observation optical path, which is split-off from the image-acquisition optical path, to be visually observed. In such a case, because the numerical aperture of the observation optical path is stopped down to smaller than the numerical aperture of the image-acquisition optical path by the action of the aperture stop provided in the observation optical path, the image that is stopped down by the aperture stop can be introduced into the pupil of the eye, and it is possible to prevent the occurrence of problems such as the image wobbling or the observation direction changing, even if the eye moves while observing a specimen having depth, thus allowing visual observation to proceed. On the other hand, in the image-acquisition optical system, it is possible to record an image with a sufficiently large numerical aperture which exceeds the numerical aperture in the observation optical system, which enables a bright, high-resolution image to be acquired.

In the present invention described above, $M < 200NA$ is preferably satisfied, where the symbol M is the overall effective magnification of the microscope, and the symbol NA is the entrance numerical aperture of the objective lens.

With such a configuration, it is possible to acquire a sufficiently bright, high-resolution image in the image-acquisition optical system. In the observation optical system on the other hand, it is possible to restrict the numerical aperture with the aperture stop, which enables stable observation to be carried out without causing image wobbling.

A preferable configuration of the present invention described above includes a relay optical system, in the observation optical path, for relaying the pupil of the objective lens, and the aperture stop is disposed in the vicinity of the conjugate position of the objective lens pupil relayed by the relay optical system.

With such a configuration, it is possible to visually observe an upright image via the relay optical system without the need for an erecting prism or the like. An upright image is particularly important in a manipulation microscope in which a specimen is manipulated while observing it with a relatively low magnification (about 30 or less). In such a case, using the aperture stop disposed in the vicinity of the conjugate position of the objective lens pupil, it is possible to stop down the numerical aperture without causing image shading. As a result, it is possible to visually observe an image that is free of brightness variations.

In the configuration described above, the optical-path-splitting member may be provided before the pupil conjugate position in the observation optical path for splitting the optical path into two, and in the vicinity of each pupil conjugate position in the two optical paths split by the optical-path-splitting member, respective aperture stops may be disposed so as to be mutually decentered relative to the observation optical path.

With this configuration, the observation optical path is split into two by the optical-path-splitting member. Therefore, images can be observed by the left and right eyes via the two respective observation optical paths which are split. In such a case, by disposing the aperture stops at the two pupil conjugate positions so as to be decentered, parallax is produced between the images observed by the left and right eyes, which enables stereoscopic observation.

What is claimed is:

1. A microscope comprising:
    an objective lens;
    an afocal variable-magnification optical system, disposed at an exit side of the objective lens, for variably magnifying the size of an image of the objective lens;
    an image-forming optical system, disposed at an exit side of the afocal variable-magnification optical system, for imaging the image of the objective lens;
    a splitting member, disposed at an exit side of an image-forming lens, for selectively splitting into an observation optical path or an image-acquisition optical path; and
    an observation optical system, disposed in the observation optical path, for visually observing an image split-off from the image-acquisition optical path;
    wherein the observation optical path comprises:
        a relay optical system for relaying a pupil of the objective lens to a pupil conjugate position;
        an optical-path-splitting member, disposed at the object side of the pupil conjugate position for splitting an optical axis of an incident beam into two optical axes for observation by both eyes, one for the left and one for the right; and an aperture stop, disposed in the observation optical path and disposed at an exit side of the image forming lens, the position of which is toward the object side with respect to the position of the image closest to the observer and is in the vicinity of a conjugate position of the objective lens pupil relayed by the relay optical system, for stopping down a numerical aperture thereof to a numerical aperture smaller than a numerical aperture of the image-acquisition optical path, and wherein the microscope satisfies the following conditional expression:

$$D > 18 \text{ mm}$$

where symbol D represents an exit beam diameter of the afocal variable-magnification optical system.

2. The microscope according to claim 1, wherein the optical-path-splitting member splits the incident beam into two beams having the same beam diameter by reflection and transmission.

3. The microscope according to claim 1, further comprising:

an optical-path-splitting member, disposed before the pupil conjugate position in the observation optical path, for splitting the optical path into two, wherein, in the vicinity of each pupil conjugate position in the two optical paths split by the optical-path-splitting member, respective aperture stops are disposed so as to be mutually decentered relative to an optical axis of the observation optical path.

4. The microscope according to claim 3, wherein the relay optical system comprises:

a plurality of reflecting members disposed in such a manner that the angles thereof can be varied.

5. The microscope according to claim 4, further comprising:

a recording apparatus for recording the image formed by the image-forming optical system.

6. The microscope according to claim 1, wherein the following conditional expression is satisfied:

$$M < 200 NA$$

where symbol M represents an overall magnification of an optical system at the observation optical path side of the objective lens, and symbol NA represents an entrance numerical aperture of the objective lens.

7. A microscope according to claim 1, wherein the variable magnification of the afocal variable-magnification optical system is from 1 to 10.

8. A microscope comprising:

an objective lens;

an afocal variable-magnification optical system, disposed at an exit side of the objective lens, for variably magnifying a size of an image of the objective lens;

an image-forming optical system, disposed at an exit side of the afocal variable-magnification optical system, for imaging the image of the objective lens;

a splitting member, disposed at an exit side of an image-forming lens, for selectively splitting into an observation optical path or an image-acquisition optical path;

an observation optical system, disposed in the observation optical path, for visually observing an image split-off from the image-acquisition optical path;

wherein the observation optical path comprises:

a relay optical system for relaying a pupil of the objective lens to a pupil conjugate position;

an optical-path-splitting member, disposed at the object side of the pupil conjugate position for splitting an optical axis of an incident beam into two optical axes for observation by both eyes, one for the left and one for the right; and an aperture stop, disposed in the observation optical path and disposed at an exit side of the image forming lens, the position of which is toward the object side with respect to the position of the image closest to the observer and is in the vicinity of a conjugate position of the objective lens pupil relayed by the relay optical system, for stopping down a numerical aperture thereof, wherein the observation aperture stop is configured to stop down the numerical aperture to a numerical aperture smaller than a numerical aperture of the image-acquisition optical path, wherein the microscope satisfies the following conditional expression:

$$M < 200 NA$$

where symbol M represents an overall magnification of an optical system at the observation optical path side of the objective lens, and symbol NA represents an entrance numerical aperture of the objective lens.

9. The microscope according to claim 8 further comprising:

an optical-path-splitting member, disposed before the pupil conjugate position in the observation optical path, for splitting the optical path into two, wherein, in the vicinity of each pupil conjugate position in the two optical paths split by the optical-path-splitting member, respective observation aperture stops are disposed so as to be mutually decentered relative to the observation optical path.

10. The microscope according to claim 9, wherein the relay optical system comprises:

a plurality of reflecting members disposed in such a manner that the angles thereof can be varied.

11. The microscope according to claim 8, further comprising:

a recording apparatus for recording an image focused by the image-acquisition optical system.

* * * * *